Patented July 31, 1945

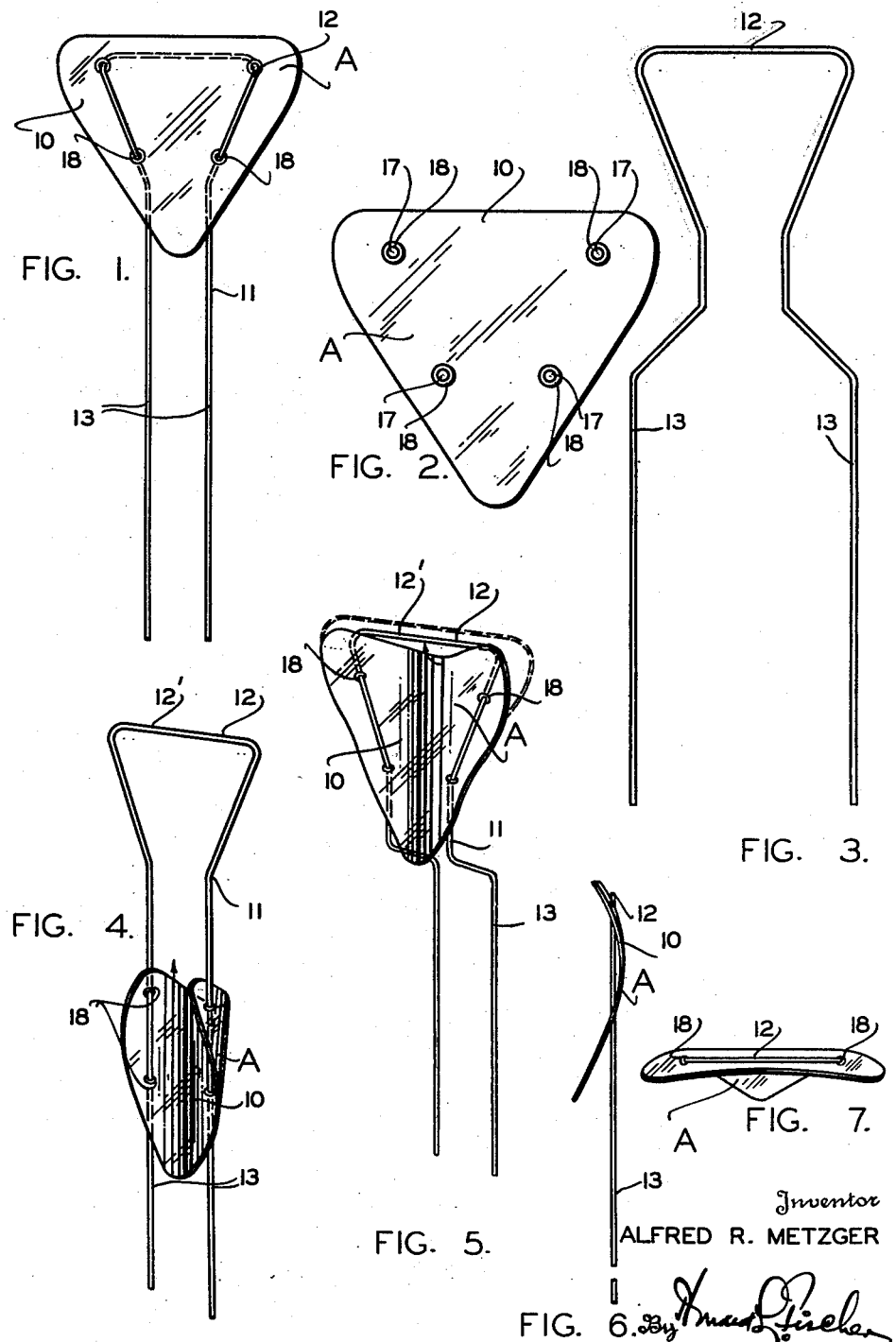
July 31, 1945. A. R. METZGER 2,380,860
AIR DEFLECTOR FOR AUTOMOBILES AND METHOD OF MAKING SAME
Filed June 26, 1941 2 Sheets-Sheet 1
Inventor
ALFRED R. METZGER

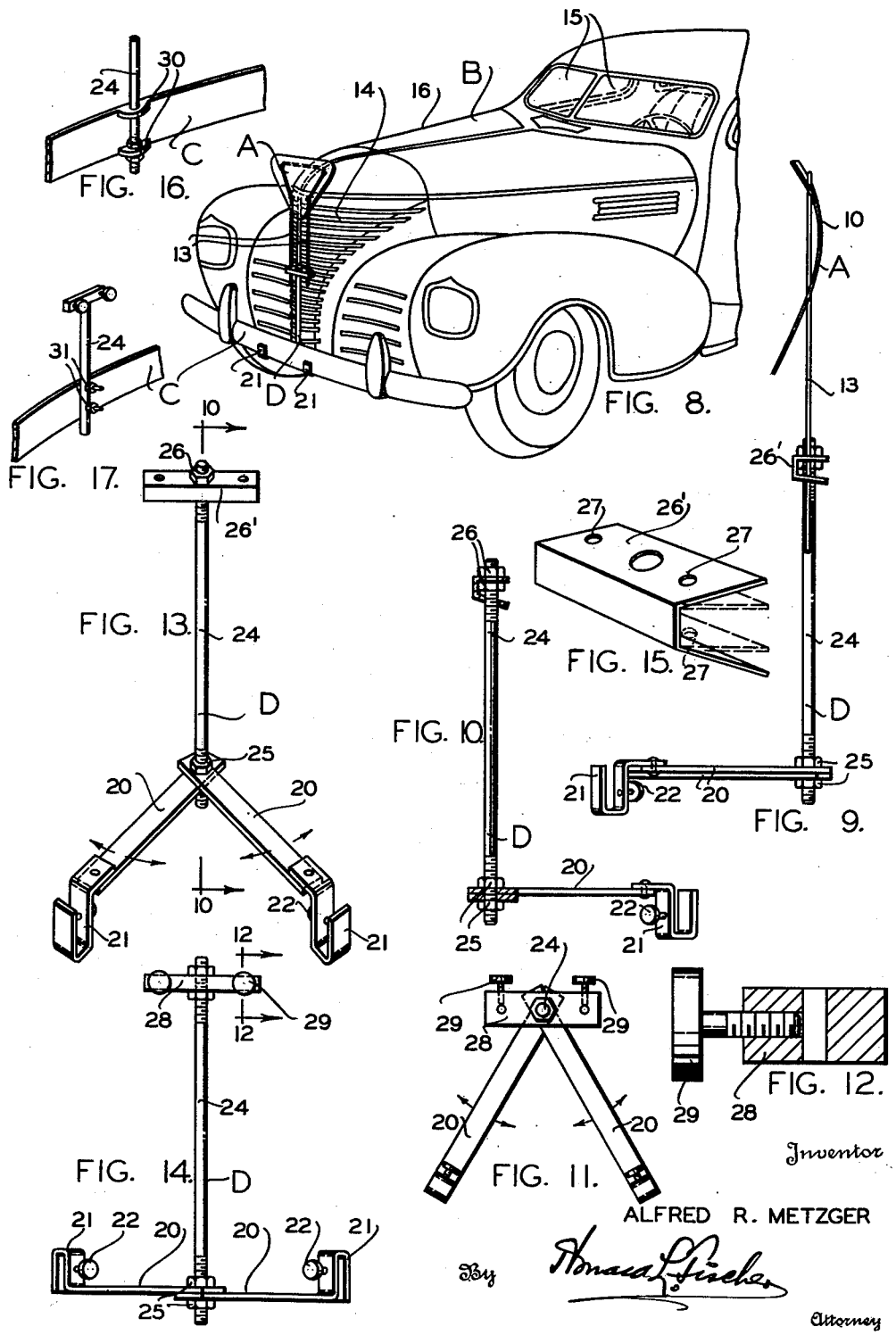

2,380,860

UNITED STATES PATENT OFFICE 2,380,860

AIR DEFLECTOR FOR AUTOMOBILES AND METHOD OF MAKING THE SAME

Alfred R. Metzger, Bald Eagle, Minn.

Application June 26, 1941, Serial No. 399,796

15 Claims. (Cl. 296—84)

My invention relates to a deflector for bugs for automobiles and vehicles, the deflector being adapted to be positioned in a manner to cause the air to be deflected away from the windshield so as to deflect bugs away from the same.

A feature of my deflector resides in providing a shield of transparent material so as not to impair the vision of the operator of the automobile, and supporting means for the shield in the form of a single wire which is threaded through openings formed in the shield.

The invention also includes the method of making a bug deflector which consists in providing a sheet-like shield member of transparent or other sheet material, forming holes in the same, reinforcing the holes with metal eyelets, forming a single piece of wire in loop-formation, then threading the free ends of the wire through the holes formed in the shield while the shield is bent to receive the wire, and sliding the shield to the closed end of the loop where the shield is stretched out flat across the loop with the legs of the wire threaded through the holes in the shield so that the closed end of the loop forms a support and brace for the shield, the free ends of the wire forming bendable, flexible legs which may be attached directly to the radiator of the motor vehicle or to a brace extending from the bumper thereof adjacent the radiator.

It is also a feature of my invention to provide a bug deflector formed of a small number of parts so that it may be economically manufactured and sold. One part of the shield member may be substantially triangular in shape, providing a series of holes in the shield member marginally of the periphery and equally spaced therefrom to space the holes substantially in a triangular position in the shield, reinforcing the holes with metal eyelets. The other part of the shield is a loop-shaped wire, the free ends of which provide attaching legs and the loop end being formed substantially triangular to correspond to the positioning of said holes formed in the shield. When my shield is made up in this manner, the wire loop is easily threaded onto the shield while the shield is folded together, and as the shield reaches the triangular loop end, it is straightened or stretched out flat so that the upper marginal edge is reinforced by the flat end of the loop while the other sides of the loop extend through the triangularly positioned holes with the free ends of the wire extending virtually parallel to each other, the triangular positioning of the holes in the shield and the triangular shaped loop end on the wire providing a simple locking means for holding the shield locked in position on the loop end of the wire.

Thus it will be apparent that the shield may be threaded on the wire when it is folded, but once the shield is positioned at the loop end and straightened out to lie flat against the wire with the transverse portion of the wire on one side of the shield and the sides of the triangular-shaped loop extending on the other side of the shield, while the free ends or flexible legs of the wire are extended on the same side of the shield as the transverse end of the wire, the shield is locked and braced on the loop end of the wire so that it will not move from this position. Therefore, it will be apparent that I provide a simple bug shield which does not require riveting of the wire to the shield to hold the shield in place on the wire. This is an important feature of my invention.

A further feature resides in providing a means of supporting the bug shield from the bumper of the automobile rather than attaching the wire legs of the shield assembly to the radiator grill. The bumper may be formed with means for supporting a standard while the standard is provided at the upper end with a clamping means for holding the legs of the bug shield in properly adjusted position to deflect the air from the main windshield of the automobile.

By deflecting the wire from the main windshield of the automobile and directing the air over the top and on either side of the car, bugs are deflected with this current of air set up by my bug shield.

The bumper of the automobile provides a convenient and practical means of supporting the bug deflector adjusted into the proper position. I have illustrated various means of attaching my bug deflector to the bumper of the automobile.

These features, together with other details and objects of my invention will be more fully and clearly set forth throughout the specification and claims.

In the drawings forming a part of my specification:

Figure 1 illustrates an assembled view of my air deflector for automobiles.

Figure 2 illustrates the shield proper which is made of transparent or of any suitable material.

Figure 3 illustrates the manner in which the flexible legs of the wire may be bent to cause the same to fit more closely to the grill of an automobile where certain designs of grills are employed.

Figure 4 illustrates one of the steps of my method of assembly and manufacture of my bug deflector, showing the shield being threaded onto the wire and in position to be slid along the legs of the wire brace.

Figure 5 illustrates another step of my process of completing the method of making my air deflector for bugs.

Figure 6 illustrates a side view of my air deflector, showing the relative position of the deflector shield on the supporting wire loop.

Figure 7 is a plan view looking down on the top of my air deflector.

Figure 8 illustrates an automobile showing my air deflector attached to the bumper of the same.

Figure 9 illustrates the bumper attaching bracket means and my air deflector in side elevation when the same is removed from the bumper of the automobile.

Figure 10 illustrates a cross-sectional view indicated by the line 10—10 of Figure 13.

Figure 11 is a plan view of the bumper bracket.

Figure 12 illustrates an enlarged sectional detail of one of the locking screws of the bumper bracket, taken on the line 12—12 of Figure 14.

Figure 13 is a perspective view of the bumper bracket.

Figure 14 is an elevational view of the bumper bracket.

Figure 15 illustrates a perspective of my spring clamp for adjustably engaging the wire legs of the support for the air deflector.

Figure 16 is a detail of a bumper, showing a means of supporting the standard which supports my air deflector to the bumper.

Figure 17 shows another form of securing the standard to the bumper.

My air deflector A is illustrated in its complete form in Figure 1 with the shield portion 10 made of transparent material and the supporting wire 11 formed with an enlarged substantially triangular-shaped end 12. The support 11 has a pair of freely disposed flexible leg wires 13 which may be straight, as illustrated in Figure 1, or may be bent as illustrated in Figures 3 and 5, or shaped in any suitable manner to support the air deflector A in a substantially vertical position to the grill 14 of the automobile B.

The drawings show the automobile B in Figure 8 with another form of support for the legs 13 of the deflector A which will be hereinafter described.

When the deflector A is secured directly to the grill 14 of the automobile B, helical wire spring clamps, not shown in the drawings, are usually used to attach the legs 13 to the grill 14, however, any suitable means may be employed to secure the legs 13 to the grill 14 so as to hold the deflector A in an upright position. The deflector A is designed to deflect air at a point forwardly of the main windshield 15 of the automobile so as to set up currents of air which extend up and over the top of the automobile as well as side currents of air which pass along the sides of the automobile when the same is traveling.

I have found that my shield A, even though comparatively small in size, as related to the size of the windshield 15, by being held in a vertical position and having a design and shape as illustrated, will cause a substantial deflection of the air over the top and away from the sides so that as the automobile is traveling, bugs in the air which are caught in these deflecting currents of air will be deflected away from the windshield 15 substantially keeping the windshield 15 clear of bugs or insects and thereby insuring clear vision for the operator of the automobile.

The shield 10 is preferably made of transparent material so that even though the same may be positioned to project above the front of the hood 16, of the automobile B, the shield will not impair the vision of the operator. In making my deflector A, I have designed the same for simplicity and economy. Therefore the same is made of mainly two parts, the shield 10 which is formed with holes 17, and the wire supporting member 11. The holes 17 may be reinforced by metal eyelets 18 or they may be without support and simply act as holes to receive the legs 13 of the wire 11. The wire 11 is formed with the enlarged end or loop portion 12 and the sides of the loop portion 12 simulate an equilateral triangle, whereas, the holes 17 are similarly placed in the body of the shield 10 so that when the shield 10 is folded together as illustrated in Figure 4, the legs 13 may be threaded through the openings 17 and the shield 10 slid along the same to the loop end 12. As the shield 10 reaches the loop 12, the shield is flattened out, the upper edge being lifted to clear the transverse portion 12' of the loop 12, which operations are illustrated in Figures 4 and 5. When the shield 10 is in place on the loop 12, it is in the position illustrated in Figure 1 and in dotted lines in Figure 5, as well as in full lines in Figure 6. In this position the shield 10 is locked against sliding on the wire support 11, owing to the positioning of the holes 17 and the manner in which the loop 12 is formed.

The shield 10 can be removed from its locked position if the body of the shield is bent so that the shield may be slid along the legs of the wire 11. In side elevation the shield A appears as illustrated in Figure 6, and Figure 7 shows the relative position of the shield from a plan view.

When the shield is in use to deflect air and set up currents so as to deflect the bugs away from the windshield 15, the lower portion of the shield flattens against the parallely extending leg portions 13. It will be apparent from Figures 6 and 7 that the shield acts more or less as an air baffle being slightly concaved even when air pressure is exerted against the same. Furthermore, the upper edge of the shield is reinforced by the transverse portion 12' of the loop 12 which extends marginally along the back of the shield body 10.

My invention includes the method of making an air deflector for automobiles to deflect bugs from the main windshield, comprising punching holes in a flat shield member, forming a wire with an enlarged loop end with freely disposed leg ends, then threading the leg ends of the wire through the holes in the shield, and sliding the shield onto the loop end where it is locked when the body of the shield is caused to lie substantially flat on the loop 12.

Further, my invention includes the adjustable supporting means for the shield A which engages with the bumper C of the automobile B and which may be in the form of the adjustable bracket D illustrated in Figures 8, 9, 10, 11 and 14. The bracket D is made up of a pair of adjustable bracket arms 20 which have end hooks 21 on the free ends and by means of the set screws 22, the hooks 21 are secured to the bumper C. The bracket arms 20 may engage under the bumper D or may be reversed so that the hooks 21 will engage over the top edge of the bumper C.

The bracket arms 20 are pivotally and adjustably connected to a common standard 24 which may be locked in position by the nuts 25 threaded on to the lower end of the standard 24. The upper end of the standard 24 carries a spring clamp 26' which is held by the nuts 26 connected to the standard 24. The spring bracket 26' is of channel shape and is formed with holes 27 adapted to receive the legs 13 of the shield A. One flange of the channel-shaped spring clamp 26' is held by the nuts 26 to lock the clamp on the upper end of the rod or standard 24, while the other flange is free and is normally formed to extend away from the fixed side of the clamp 26'. Thus when it is desired to attach the legs 13 to the clamp 26', it is only necessary to squeeze the free side of the channel toward the fixed side so that the holes 27 are in straight alignment, whereupon the wire legs 13 can be inserted through the holes 27 and when the shield A is in properly adjusted position as to height, the free side of the clamp 26' is released and tends to bite into the wire legs 13 to hold them clamped in place. If an adjustment is necessary at any time of the air deflector A, it is only necessary to squeeze the sides of the clamp 26' together until the legs 13 ride freely in the holes 27. Thus I provide a quick easy adjustment for the air deflector A.

The bracket D supports the air deflector A solely from the bumper D. Thus the deflector A may be adjusted close to the grill 14 or may be extended away from the same in the proper adjusted position so as to set up the air currents ahead of the windshield 15 and prevent bugs from striking the same. The upper bracket for the wire legs 13 may be a clamp 28 which is fixed to the standard 24 by the nuts 26 and a pair of set screws 29 may be operated to engage the legs 13 and lock them in adjusted position in the clamp 28.

The bumper C may be formed with ears 30 or the ears 30 may be welded to the same so as to receive the upright standard 24 to adjustably support the same directly to the bumper without the bracket arms 20. This provides a simple construction of supporting the standard 24 to the bumper C. I have also illustrated in Figure 17 the bolting of the standard 24 by the bolts 31 to the bumper C.

In the present designs of automobiles various designs of radiator grills are used and with some of these styles it is difficult to attach the deflector A directly to the grill. Therefore, I have provided a bumper attachment for my air deflector which does not detract from the design or appearance of the automobile, and while I have illustrated a particular means of attachment to the bumper, the same is only illustrative of a manner in which this may be accomplished and obviously various designs or means may be employed within the scope of the invention as defined in the following claims.

I claim:

1. An air deflector for causing bugs to be deflected away from the main windshield of a vehicle, including a substantially upright transparent deflector shield member, a plurality of holes formed in the body of said deflector member, and a substantially upright wire threaded through said plurality of holes and shield to underlie vertically spaced portions of said shield to reinforce said shield against wind pressure directed thereagainst when the vehicle is in motion.

2. An auxiliary windshield for automobiles having a front bumper, including a small transparent shield member, a plurality of transversely spaced supports projecting downwardly therefrom and bracket means extending from the bumper and engaging said spaced supports for supporting said shield adjustably positioned in a substantially upright position adjacent the radiator grill and projecting above the forward portion thereof and spaced from the grill.

3. The method of making a bug deflector for automobiles consisting in forming a wire with an enlarged loop portion having a pair of freely disposed ends extending therefrom and being of the same length, forming an air shield of a flat piece of material with holes therein spaced apart a distance greater than the distance between the free ends of said wire and folding the air shield so that the free ends of the wire can be threaded through the shield, and sliding the shield along the wire until the enlarged loop portion engages the holes of the shield to lock the shield to the wire.

4. The method of making an air deflector for automobiles to deflect bugs from the main windshield thereof, consisting in punching holes in a flat shield member, forming a wire with an enlarged loop end with freely disposed leg ends, then threading the leg ends of the wire through the holes in the shield until the shield is locked in position on the wire at the loop end.

5. The method of making an air deflector for deflecting bugs from the windshield of an automobile consisting in punching holes in a flat shield-like member, forming a wire with a loop end and freely disposed parallelly extending legs, then threading the legs of the wire through the holes in the shield, the loop in the wire acting with the holes in the shield to lock the shield to the wire when the shield is substantially flat with the wire, the leg ends of the wire forming adjustable supports for securing the shield to an automobile.

6. A flexible air deflector for vehicles to set up air currents in front of the main windshield of the vehicle, including a generally upright transparent flexible sheet-like body, holes formed in said body some of which are above the level of others, a wire for supporting said body having a loop end, said wire on either side of said loop end extending through a plurality of said holes through said body.

7. A bug deflector for motor vehicles comprising a small upright shield member having a pair of laterally spaced openings therethrough and having a second pair of laterally spaced openings therethrough above the level of said first named openings, a wire supporting member having a loop end arranged to underlie said shield between said last named pair of openings and a pair of depending legs extending through the first named openings and underlying an adjacent portion of the shield member.

8. An air deflector for automobiles comprising an upright shield of flexible sheet material having two pairs of openings therethrough, one pair of openings being above the level of the other pair of openings, and a support for said shield comprising a pair of spaced legs and a top connecting member connecting said legs, the connecting portion of said support underlying said shield between the uppermost pair of openings, and the legs of said support overlying the surface of said shield between the upper and lower openings of said pairs of openings.

9. A bug deflector comprising a substantially upright shield formed of flexible sheet material and having two pairs of laterally spaced openings therethrough, one pair of openings being above the level of the other pair thereof, and a support for said shield comprising a pair of spaced legs and a top connecting member connecting said legs, said top connecting member underlying said shield between the spaced openings of said uppermost pair of openings, and each of said legs extending through one of the openings of the other pair of openings, each leg overlying a portion of said shield between upper and lower openings and underlying a portion of the shield below the lowermost openings.

10. A bug deflector for motor vehicles comprising a substantially upright shield of flexible sheet material, said shield having vertically spaced openings therethrough, and a support for said shield including a straight element designed to underlie a lower portion of said shield, to overlie an intermediate portion of said shield, and to underlie an upper portion of said shield, said support lying on a single plane from upper to lower extremity so as to curve said shield into concave shape.

11. A bug deflector for vehicles comprising a substantially upright shield of flexible material, said shield having a pair of laterally spaced uppermost openings therethrough, and a pair of laterally spaced lowermost openings therethrough, said uppermost openings being spaced apart a distance considerably greater than the lowermost openings, and a shield support comprising a top connecting member of a length substantially equal to the spacing of said uppermost openings and spaced leg portions on said top connecting member, said spaced leg portions tapering together adjacent said top connecting member to pass through said lowermost openings, and said leg portions terminating in substantially parallel free ends.

12. An air deflector for a vehicle having a front bumper, comprising a shield, a shield support including a pair of laterally spaced legs secured to said shield and projecting downwardly therefrom, and bracket means secured to said front bumper and a standard on said bracket means adjustably connected to said shield support.

13. A bug deflector for motor vehicles having a front bumper, comprising a substantially upright shield, a support extending downwardly from said shield, bracket arms secured to said bumper and extending inwardly therefrom at laterally spaced points, a standard secured to said arms and extending upwardly therefrom, and means adjustably connecting said standard to said shield support.

14. A bug deflector for vehicles comprising an upright shield, a pair of substantially parallel spaced legs extending downwardly from said shield, a resilient channel secured to said vehicle including vertically spaced resilient flanges thereon, said flanges having openings therethrough through which said legs may extend, the resilience of said flanges locking said legs in adjusted position.

15. A bug shield for vehicles having a front bumper comprising a generally upright shield member, a pair of supporting legs secured to said shield member and extending downwardly therefrom, a channel having vertically spaced resilient flanges thereupon normally spread apart beyond parallel relationship, means connecting said channel to the front bumper of the vehicle, and said flanges having spaced openings therethrough through which said legs may extend, said legs sliding freely through said openings when said flanges are bent into parallel relationship, and being clamped by said flanges in normal spread position thereof.

ALFRED R. METZGER.